Patented Oct. 29, 1929

1,733,494

UNITED STATES PATENT OFFICE

LESTER KIRSCHBRAUN, OF CHICAGO, ILLINOIS

PROCESS OF MAKING BITUMINOUS EMULSION

No Drawing. Original application filed January 17, 1921, Serial No. 438,050. Divided and this application filed May 25, 1925. Serial No. 32,839.

This application is a division of an application filed by me, Serial No. 438,050 on January 17th, 1921.

This invention relates to improvements in process of making bituminous emulsion and refers more particularly to aqueous bituminous emulsions in which the adhesive particles of bituminous or like substances are enveloped in a non-adhesive film or coating rendering the emulsion non-adhesive.

Among its salient objects are to provide a process or method of making emulsions of bituminous or other adhesive substances by emulsifying the same with clay or like colloidal particles in an aqueous liquid with the addition of a third substance which has a characteristic of causing the non-adhesive coating surrounding each of the dispersed adhesive particles to more firmly envelop the adhesive bitumen or like adhesive substance dispersed through the emulsion so that the emulsion is very resistant to pressure, dilution or any other factor commonly tending to disintegrate the enveloping non-adhesive coatings; to provide a process in which, by means of the addition of a third substance, the clusters of non-adhesive particles surrounding the adhesive material in the emulsion are caused to cling tenaciously to the adhesive substance, making the emulsion substantially more permanent in its character; to provide a process in which, during the combination of the emulsifying and adhesive substances, the surface of the emulsion is kept constantly covered by the emulsifying agent whereby the formation of oily or greasy particles is obviated, producing a non-adhesive emulsion; to provide a process in which, due to the addition of a third substance, which is slightly acid in character, the formation of the oil particles produced during emulsification is reduced materially, and in general, to provide a process of the character referred to.

In carying out commercially the invention described in Letters Patent No. 1,302,810 issued May 8th, 1919, and as supplemented by subsequent applications and particularly an application Serial No. 274,497, filed February 1st, 1919, it has been the practice to produce a non-adhesive emulsion by dispersing adhesive bituminous binders with an emulsifying agent such as colloidal clay in an aqueous vehicle.

The bituminous material is, of course, in the dispersed phase while the water constitutes the continuous phase of such emulsion, the colloidal clay particles acting to coat or enclose the dispersed particles of bituminous binder probably by adsorption thereby protecting the particles of binder from adhesiveness. Under certain conditions when, for example, large proportions of asphalt were dispersed with small amounts of clay or when the emulsion, after being made, was subjected to extreme dilution with water, I have found the insulating or protecting quality of the clay particles could be effectively increased by the use of a fixing agent which caused the clay to cling or cluster more tenaciously about the particles of bituminous material. This function of the clay can be readily observed by microscopic examination of the emulsion, particularly with the use of stains such as malachite green which bring the clay particles into effective view. In other words, the third substance acts as a flocculating agent.

The formation of oily free particles in the emulsion, which seems to take place to a greater extent upon the hot surface thereof, was objectionable when it was desired to run the emulsion over a paper machine with fibrous stock or in other manufacturing uses when a maximum degree of non-adhesiveness was desired. From experimentation, it has been learned that a slight alkalinity of the clay promotes this oily condition of the emulsion. Lime in the clay will give like results and by adding alkali into the clay during emulsification, the tendency to produce oily particles is greatly accelerated.

To obviate this objectionable tendency, I add a third substance, having a slightly acid reaction, and having the purposes of a flocculating agent, to the emulsifying agent in its aqueous vehicle. Such substances as aluminum sulphate, sodium acid phosphate and others of a similar character supply elements to the emulsion which obviate the formation of these oily particles upon the surface of the emulsion during the mixing and, in addition, tend to cause the particles of emulsifying agent to cluster around the adhesive substance dispersed through the emulsion as before described. The addition of a third substance, such as aluminum sulphate, to an amount of one to fifteen per cent of the emulsifying agent in the emulsion is satisfactory to produce these results. However, it is understood that the quantity and concentration of this third substance is susceptible of variation according to its character and may be regulated according to the quality of the emulsifying agent used and the character of the bituminous adhesive substance to be emulsified. In producing this emulsion, the emulsifying agent, which may be clay, is thoroughly mixed in an aqueous vehicle and the third substance, which, as described, may be aluminum sulphate, sodium acid phosphate or numerous other materials having a slightly acid reaction or substances giving the above described results and not having the acid reaction, for example, of calcium chloride, is added to the aqueous suspension. This suspension is combined with the asphalt in a mixer in which there are large paddles kept constantly revolving to thoroughly disperse the bituminous substance through the emulsifying liquid. The construction of this mixer is of importance as one of the essential factors in the formation of the emulsion is that the surface of the emulsion must be kept at all times covered by the emulsifying agent which is added. While I am not exactly certain of the cause of this oily formation, its appearance, when the hot emulsion contacts with air, seems to indicate some influence of the air in promoting what appears to be a capillary fractionation of some of the asphaltic particles. It is this keeping of the surface of the emulsion constantly covered in connection with the reagent used which reduces the formation of the oil particles during emulsification.

By placing the revolving paddles on a vertical shaft within an inner open-ended cylinder and causing a circulation of the emulsion downward through the inner cylinder and upward about the annular space between the inner and outer cylinder and simultaneously with this circulation adding the emulsifying agent in its aqueous vehicle to the outer circumference of the upper emulsion surface, the emulsifying agent is caused to flow inwardly with the emulsion completely covering its surface. During this operation the emulsion is in the form of a stiff paste and sluggish to accelerate during mixing. It may be mentioned in this regard that the third substance added to assist in causing the non-adhesive particles of the emulsifying agent to more firmly envelop the adhesive particles of the bituminous substances assists the emulsifying agent in reducing the formation of the oil particles on the surface of the emulsion, a factor which may be due to the character of the material itself or to the fact that it gives the emulsifying agent the tendency to cling to the adhesive particles and, therefore, more completely protect those exposed on the surface during the initial mixing.

While the effect of the fixing agent is substantially the same whether added before or after the formation of the emulsion in so far as clustering is concerned, if desired to reduce the oily formation, it is preferably added with clay and water prior to emulsification.

I claim as my invention:

1. A process of forming an emulsion comprising dispersing an adhesive bituminous-type material in an aqueous medium containing a dispersion means, and adding a fluocculating agent to the dispersion means prior to the combination of the dispersion means in its aqueous vehicle with the bituminous-type material, whereby to cause the particles of the dispersion means to more tenaciously gather about the dispersed particles of bitumen.

2. A process of forming a non-adhesive emulsion comprising emulsifying an adhesive bituminous-type substance with an emulsifying agent in an aqueous vehicle and adding a flocculating agent having an acid reaction to the emulsifying agent in its aqueous vehicle prior to its emulsification with the adhesive bituminous substance.

3. A process of forming an emulsion comprising emulsifying a bituminous-type substance with a clay-like emulsifying agent in an aqueous vehicle and adding a flocculating agent having an acid reaction to the emulsifying agent in its aqueous vehicle prior to its emulsification with the bituminous-type substance.

4. A process of forming an emulsion comprising dispersing asphalt in an aqueous vehicle containing a paste forming mineral powder and adding a flocculating agent having an acid reaction to said paste forming mineral powder in its aqueous vehicle prior to its emulsification with the asphalt.

5. An emulsion comprising a water resistant material of the heat liquefiable type dispersed in an aqueous vehicle containing an emulsifying agent and a flocculating agent having an acid reaction and causing flocculating of the emulsion.

6. An emulsion comprising a water resistant material of the heat liquefiable type dispersed in an aqueous vehicle containing an emulsifying agent and a metallic salt having an acid reaction and capable of flocculating the emulsion.

7. A dispersion resistant to breaking by substantial quantities of electrolytes comprising water-resistant material of the bitumen-pitch type dispersed in an aqueous vehicle containing a dispersing agent inert to electrolytes, and a flocculating agent in sufficient quantity to cause the dispersed particles to cluster about each other.

8. A dispersion inert to electrolytes comprising water-resistant material of the heat liquefiable bitumen-pitch type dispersed in an aqueous vehicle containing a dispersing agent of the mineral powder type, and a flocculating agent in sufficient quantity to cause the dispersed particles to cluster about each other.

9. A dispersion comprising water-resistant material of the heat liquefiable bitumen-pitch type dispersed in an aqueous vehicle containing a dispersing agent and a flocculating agent in sufficient quantity to cause flocculation of the dispersed particles but insufficient to induce breaking of the dispersion.

LESTER KIRSCHBRAUN.